United States Patent

Yu et al.

(10) Patent No.: US 9,307,241 B2
(45) Date of Patent: Apr. 5, 2016

(54) VIDEO ENCODING METHOD AND A VIDEO ENCODING APPARATUS USING THE SAME

(71) Applicant: Tencent Technology (Shenzhen) Company Limited, Shenzhen (CN)

(72) Inventors: Chenchen Yu, Shenzhen (CN); Jing Lv, Shenzhen (CN); JingChang Chen, Shenzhen (CN); Quanzhan Zheng, Shenzhen (CN); Ronggang Wang, Shenzhen (CN); Jie Wan, Shenzhen (CN); Wen Gao, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 440 days.

(21) Appl. No.: 13/954,837

(22) Filed: Jul. 30, 2013

(65) Prior Publication Data

US 2014/0056353 A1    Feb. 27, 2014

(30) Foreign Application Priority Data

Aug. 21, 2012   (CN) .......................... 2012 1 0298932

(51) Int. Cl.
*H04N 7/36* (2006.01)
*H04N 19/577* (2014.01)
(Continued)

(52) U.S. Cl.
CPC ....... *H04N 19/00721* (2013.01); *H04N 19/105* (2014.11); *H04N 19/147* (2014.11); *H04N 19/176* (2014.11); *H04N 19/513* (2014.11)

(58) Field of Classification Search
CPC ..... H04N 7/50; H04N 7/462; H04N 7/26244; H04N 7/26132; H04N 7/26015; H04N 5/775; H04N 5/781; H04N 9/7921; H04N 9/8042; H04N 5/76; H04N 9/8063; H04N 21/4532; H04N 21/47214; H04N 5/783; H04N 21/8456; H04N 21/4147; H04N 21/454; H04N 5/782; H04N 19/172
See application file for complete search history.

(56) References Cited

U.S. PATENT DOCUMENTS

| | | | | |
|---|---|---|---|---|
| 7,609,763 B2 * | 10/2009 | Mukerjee | ............... | H04N 19/56 375/240.16 |
| 2005/0053294 A1 * | 3/2005 | Mukerjee | ............... | H04N 19/52 382/236 |

(Continued)

FOREIGN PATENT DOCUMENTS

| | | |
|---|---|---|
| CN | 101572817 A | 11/2009 |
| CN | 101621692 A | 1/2010 |

(Continued)

OTHER PUBLICATIONS

Tencent Technology Company Limited, International Search Report and Written Opinion, PCT/CN2013/076256, Sep. 5, 2013, 10 pgs.

(Continued)

*Primary Examiner* — Sath V Perungavoor
*Assistant Examiner* — Howard D Brown, Jr.
(74) *Attorney, Agent, or Firm* — Morgan, Lewis & Bockius LLP

(57) ABSTRACT

The present application provides a video encoding method that includes setting frame types for a video sequence; obtaining a B frame; determining whether a current macroblock of the B frame satisfies a Direct prediction mode, and if yes determining whether the current macroblock satisfies a Skip prediction mode; if the current macroblock does not meet either mode, computing at least one of a mode cost after performing motion compensation on the current macroblock using two bidirectional prediction motion vectors obtained in the Direct prediction mode; a mode cost after performing motion compensation on the current macroblock using a forward prediction motion vector obtained in the Direct prediction mode; and a mode cost after performing motion compensation on the current macroblock using a backward prediction motion vector obtained in the Direct prediction mode; and selecting a mode with a smallest cost as an optimal prediction direction to encode the current macroblock.

15 Claims, 9 Drawing Sheets

(51) Int. Cl.
*H04N 19/105* (2014.01)
*H04N 19/176* (2014.01)
*H04N 19/147* (2014.01)
*H04N 19/513* (2014.01)
*H04N 7/12* (2006.01)
*H04N 11/04* (2006.01)

(56) References Cited

U.S. PATENT DOCUMENTS

| | | | | |
|---|---|---|---|---|
| 2005/0053296 A1* | 3/2005 | Srinivasan | ............ | H04N 19/176 |
| | | | | 382/236 |
| 2005/0053300 A1* | 3/2005 | Mukerjee | ............. | H04N 19/105 |
| | | | | 382/239 |
| 2007/0019730 A1* | 1/2007 | Lee | ......................... | H04N 19/52 |
| | | | | 375/240.15 |
| 2007/0217510 A1* | 9/2007 | Yamori | ................... | H04N 19/52 |
| | | | | 375/240.12 |
| 2008/0240248 A1* | 10/2008 | Lee | .................... | H04N 7/26872 |
| | | | | 375/240.16 |
| 2009/0238268 A1* | 9/2009 | Hsu | ......................... | H04N 19/51 |
| | | | | 375/240.12 |
| 2009/0310682 A1* | 12/2009 | Chono | ................. | H04N 19/139 |
| | | | | 375/240.16 |
| 2010/0128792 A1* | 5/2010 | Saito | ..................... | H04N 19/105 |
| | | | | 375/240.16 |
| 2012/0250767 A1* | 10/2012 | Valldosera | ........... | H04N 19/139 |
| | | | | 375/240.15 |
| 2015/0319437 A1* | 11/2015 | Zhang | ................... | H04N 19/124 |
| | | | | 375/240.03 |

FOREIGN PATENT DOCUMENTS

| | | |
|---|---|---|
| CN | 101860747 A | 10/2010 |
| CN | 102447902 A | 5/2012 |
| JP | 2005035520 A | 2/2005 |

OTHER PUBLICATIONS

Yu, C., First Office Action, CN201210298932X, Oct. 28, 2014, 5 pgs.

* cited by examiner

VIDEO ENCODING METHOD AND A VIDEO ENCODING APPARATUS USING THE SAME

RELATED APPLICATION

This application claims priority to Chinese Patent Application No. 201210298932. X, entitled "A VIDEO STREAM ENCODING METHOD AND APPARATUS," filed Aug. 21, 2012, which is incorporated by reference in its entirety.

TECHNICAL FIELD

The disclosed implementations relate generally to the field of video encoding technology, and in particular, to a video encoding method and a video encoding apparatus.

BACKGROUND

H.264/AVC is the latest international video encoding standard jointly developed by ITU-T and ISO/IEC. Comparing to previous video encoding standards, H.264/AVC is designated by JVT as the latest video encoding standard with the highest encoding efficiency and the strongest network adaptability. With the same bit rate, H.264/AVC can achieve better encoding efficiency and best image quality. In particular, comparing to MPEG-4, the encoding performance of H.264/AVC at a low bit rate is significantly improved, and is mostly applicable for the low-bandwidth and high-quality network video application. To achieve better encoding efficiency, H.264/AVC employs various new technologies, and has higher computation complexity comparing to the previous video encoding standards. Thus, real-time encoding in hardware and software becomes more difficult. With respect to a mobile platform, due to the limitation of computing capacity and network bandwidth, real-time video communication on the mobile platform progresses fairly slow. Therefore, to reduce encoding complexity and improve encoding efficiency is very important for real-time transmission and compression of the videos on the mobile platform.

In video encoding, a video sequence is formed by consecutive Group of Picture (GOP). One GOP is a group of consecutive pictures, which usually starts with an I frame (intra-encoded frame) followed by several P frames (predictive-encoded frames) with several B frames (bidirectional-encoded frames) inserted there-between. The length of a GOP may be configured according to different encoding methods. In a general video encoding technology, predictive encoding is first performed on a video sequence and a difference signal between an image pixel and its predicted value is transmitted. By eliminating the space correlation or time correlation, image compression can be achieved. The predictive encoding includes intra-frame prediction encoding and inter-frame prediction encoding, where the intra-frame prediction encoding predicts using pixel values within one frame, and the inter-frame prediction encoding predicts using pixel values in adjacent frames.

In a standard encoding process of H.264/AVC, a currently input image is encoded using a macroblock (for example, a 16×16 pixels) as an encoding unit. When intra-frame encoding is applied, a corresponding intra-frame prediction encoding mode is selected to perform intra-frame prediction, and the difference between the actual pixel values and the predicted pixel values is transformed, quantized and entropy encoded. Later, the entropy encoded bit stream is transmitted to the communication channel. Meanwhile, the encoded bit stream is inverse-quantized and inverse-transformed to reconstruct the residual image. The residual image is later added into the predicted pixel values, and the result is smooth processed via a de-blocking filter and transmitted to a frame memory to be used as a reference image for the next frame encoding. When inter-frame encoding is applied, motion estimation is first performed on an inputted image with respect to a reference frame to obtain a motion vector. Later, the motion compensated residual image along with the motion vector is transmitted to the communication channel after integer transformation, quantization and entropy encoding. Meanwhile, another bit stream is reconstructed in the same way via the de-blocking filter, and transmitted to the frame memory to be used as a reference image for the next frame encoding. In an inter-frame encoding mode, reference objects are one or more reconstructed frames from previously encoded frames.

The inputted image according to H.264/AVC standard may be categorized into I frame, P frame and B frame. In general, the I frame and the P frame are used as reference frames. During encoding, the P frame has only a forward prediction mode, while the B frame has a forward prediction mode, a backward prediction mode and a bidirectional prediction mode. Prediction modes of the I frame are all intra-frame prediction encoding modes, and prediction modes of the P frame and the B frame include intra-frame prediction encoding modes and inter-frame prediction encoding modes, where the inter-frame prediction encoding modes are the majority of the prediction encoding modes.

Inter-frame prediction is a prediction mode using an encoded and reconstructed video frame and based on motion compensation. An image frame that a currently encoded pixel lies in is referred to as a current frame, and an image frame used for prediction is referred to as a reference frame. A 16×16-pixel encoding macroblock can be divided into different sub-blocks and form seven sub-block sizes (including 16×16, 16×8, 8×16, 8×8, 8×4, 4×8, and 4×4) in different dividing modes. One independent motion vector must be provided for each division area. Each motion vector and a dividing mode of the macroblock must be encoded and transmitted. When a dividing mode with a large sub-block size is selected, fewer bits may be used to represent the motion vector and the dividing mode of the macroblock. However, in a detailed area of the image, a residual image after motion compensation using the large sub-block size may have more energy (i.e., error). When a dividing mode with a small sub-block size is selected, the image can be predicted more precisely, and the residual image after motion compensation using the small sub-block size may have less energy. However, more bits are needed to represent the motion vector and the dividing mode of the macroblock.

H.264/AVC encoding standard applies a Direct prediction mode in the B frame, where a prediction motion vector obtained from encoded information is directly used as a motion vector of the current macroblock, therefore motion vector of the macroblock does not need to be encoded. Because the B frame supports bidirectional prediction, two prediction motion vectors pointing to different reference frames may be obtained in the Direct mode. A forward prediction motion vector and a backward prediction motion vector of a time domain Direct mode are computed through motion vectors of the corresponding frames positioned in a temporal order, respectively; and a forward prediction motion vector and a backward prediction motion vector of a space domain Direct mode are computed through motion vectors of the corresponding forward reference frame and backward reference frame positioned in a spatial order, respectively.

In a conventional video encoding method, a first frame in a GOP is generally encoded as an I frame, and a second (1+1) frame to a $(1+n)^{th}$ frame are set as B frames, and the n B frames are cached. An $(n+2)^{th}$ frame is set as a P frame and encoded. Finally, the B frames from the second frame to the $(1+n)^{th}$ frame are successively encoded, and the last frame of each GOP is encoded as a P frame. An example of an encoded sequence with a GOP of a length 7 and n=1 in the conventional art is shown in FIG. 8, where an arrow represents a reference direction.

When a certain image frame is determined as a B frame, during encoding, an optimal block encoding mode needs to be determined for each macroblock. Specifically, it needs to be first determined, according to a prediction motion vector of a current macroblock, whether the current macroblock meets a condition of the Direct mode, if yes, it is further determined whether the current macroblock meets a condition of a Skip mode, and if yes, the Skip mode is selected as the optimal encoding mode. The Skip mode is to directly copy a corresponding pixel of a reference frame according to the prediction motion vector, where a motion vector difference and a pixel residual are not written into a bit stream. If the current macroblock meets the condition of the Direct mode but does not meet the condition of the Skip mode, a cost when the macroblock is encoded in a Direct_16×16 mode is computed. If the macroblock does not meet the condition of the Direct mode, the computation of the cost in the Direct_16×16 mode is skipped. Further, motion estimation is performed for each macroblock dividing mode of the current macroblock, which includes computing inter-frame prediction encoding costs in the macroblock dividing modes, and computing intra-frame prediction encoding costs for different prediction directions in the macroblock dividing modes. The costs in all these modes are compared, and a mode with the smallest cost is selected as an optimal block encoding mode.

As described above, in the conventional video encoding mode, when a mode is selected for encoding a B frame, in the optimal block encoding mode of the current macroblock, motion vectors of the inter-frame modes need to be obtained through motion estimation, and cost values of the modes need to be computed through intra-frame prediction encoding in different prediction directions. A mode with the smallest cost value is selected as the optimal encoding mode through comparing the cost values of the modes. Finally, a motion vector residual, a pixel value residual, and a mode bit (a flag bit indicating an encoding mode of the current macroblock) are encoded together into a bit stream. Therefore, in the conventional video encoding mode, the computation of mode selection in encoding a B frame involves very high complexity. In the entire encoding process, the mode selection is mostly time-consuming, which results in very high computation complexity and a large amount of computation in the entire video encoding process, and reduces video encoding efficiency.

SUMMARY

The present application provide a video encoding method that reduces the computation complexity and the amount of computation and improves the video encoding efficiency to solve the problem in the prior art.

A video encoding method is provided, which includes the steps of:
setting frame types for a plurality of video frames in a video sequence;
obtaining a video frame set as a B frame;
determining whether a current macroblock of the video frame satisfies a Direct prediction mode, and when the current macroblock satisfies the Direct prediction mode, further determining whether the current macroblock satisfies a Skip prediction mode;
if the current macroblock does not satisfy the Direct prediction mode or the current macroblock does not satisfy the Skip prediction mode, computing at least one of the plurality of mode costs:
a mode cost after performing motion compensation on the current macroblock using two bidirectional prediction motion vectors obtained in the Direct prediction mode;
a mode cost after performing motion compensation on the current macroblock using a forward prediction motion vector obtained in the Direct prediction mode; and
a mode cost after performing motion compensation on the current macroblock using a backward prediction motion vector obtained in the Direct prediction mode; and
selecting a mode with a smallest cost in the plurality of mode costs as an optimal prediction direction to encode the current macroblock.

Further, a video encoding apparatus that reduces the computation complexity and the amount of computation and improves the video encoding efficiency is also provided.

The video encoding apparatus includes a frame type setting module configured to set frame types for a plurality of video frames in a video sequence, and a B frame encoding module, where the B frame encoding mode includes:
a B frame obtaining module configured to obtain a video frame set as a B frame;
a determining module configured to determine whether a current macroblock of the video frame satisfies a Direct prediction mode, and when the current macroblock satisfies the Direct prediction mode, further determine whether the current macroblock satisfies a Skip prediction mode;
a mode selecting module configured to compute at least one of the plurality of mode costs if the current macroblock does not satisfy the Direct prediction mode or the current macroblock does not satisfy the Skip prediction mode,
a mode cost after performing motion compensation on the current macroblock using two bidirectional prediction motion vectors obtained in the Direct prediction mode;
a mode cost after performing motion compensation on the current macroblock using a forward prediction motion vector obtained in the Direct prediction mode; and
a mode cost after performing motion compensation on the current macroblock using a backward prediction motion vector obtained in the Direct prediction mode; and
the mode selecting module is further configured to select a mode with a smallest cost in the mode costs as an optimal prediction direction; and
an encoding module configured to encode the current macroblock according to the selected optimal prediction direction.

In the video encoding method and video encoding apparatus set forth above, when the B frame is encoded, by computing the mode costs after performing motion compensation on the current macroblock using prediction motion vectors in different directions, the mode with a smallest cost is selected as the optimal prediction mode to encode the current macroblock. During the mode selection, a motion vector of each inter-frame mode and a cost value of each mode do not need to be computed via motion estimation, and only the Skip prediction mode and the Direct prediction mode are kept. During the mode selection, only the mode costs after performing motion compensation on the current macroblock using different prediction motion vectors need to be computed, therefore the computation complexity and the amount of computation are reduced, and the video encoding efficiency can be improved.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

In the present invention, when a B frame is encoded, only a Skip mode and a Direct mode are kept, and a conventional Direct prediction mode is improved, where mode costs after performing motion compensation on a current macroblock using prediction motion vectors in different directions are computed, a mode with the smallest cost is selected as an optimal prediction direction, and encoding is performed according to a prediction motion vector in the optimal prediction direction. Comparing to the conventional video encoding method, when the B frame is encoded, the amount of computation and computation complexity required during mode selection are reduced, thereby improving the video encoding efficiency.

Figure 1:
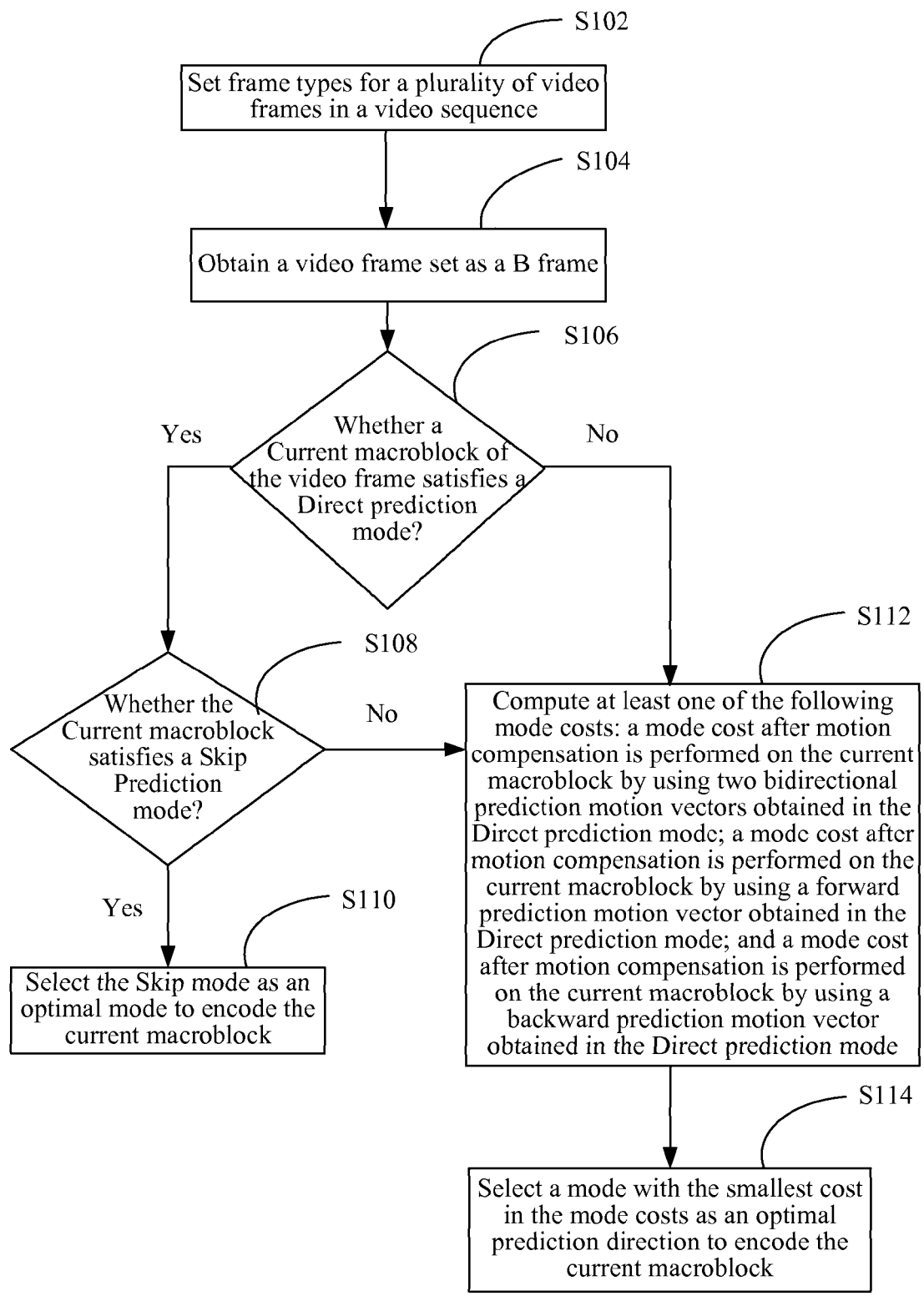
FIG. 1 is a schematic flow chart of a video encoding method in some implementations of the present invention.

As shown in FIG. 1, in some implementations of the present invention, a video encoding method is provided, which includes the following steps.

Step S102: Set frame types for a plurality of video frames in a video sequence.

Specifically, in step S102, a frame type for each frame in the video sequence may be determined The first frame in the video sequence is encoded as an I frame, and for other frames, it needs to be determined whether the frame is to be encoded as a P frame or a B frame.

Step S104: Obtain a video frame set as a B frame.

Step S106: Determine whether a current macroblock of the video frame satisfies a Direct prediction mode, and if yes, proceed to step S108; otherwise, proceed to step S112.

In some implementations, two bidirectional prediction motion vectors of the current macroblock of the video frame may be obtained through the Direct prediction mode. Further, if each of the obtained bidirectional prediction motion vectors is within a preset threshold value range, the current macroblock satisfies the Direct prediction mode; otherwise, the current macroblock does not satisfy the Direct prediction mode.

Step S108: Further determine whether the current macroblock satisfies a Skip prediction mode, and if yes, proceed to step S110; otherwise, proceed to step S112.

In some implementations, motion compensation is performed on the current macroblock using the obtained two bidirectional prediction motion vectors, thereby generating a predicted pixel value. A pixel residual is obtained by subtracting the predicted pixel value from the original pixel value. After the pixel residual is transformed and quantized, if residual system energy (e.g., which can be the number of residual coefficients greater than 1 in a macroblock or residual coefficients weighted according to their respective positions in a macroblock) is greater than a pre-set threshold value, a condition of the Skip prediction mode is not satisfied; otherwise, the Skip prediction mode is satisfied.

Step S110: Select the Skip mode as an optimal mode to encode the current macroblock.

The conventional Skip prediction mode may be applied to encode the current macroblock, which is not described herein again.

Step S112: Compute at least one of the plurality of mode costs: a mode cost after performing motion compensation on the current macroblock using the two bidirectional prediction motion vectors obtained in the Direct prediction mode; a mode cost after performing motion compensation on the current macroblock using a forward prediction motion vector obtained in the Direct prediction mode; and a mode cost after performing motion compensation on the current macroblock using a backward prediction motion vector obtained in the Direct prediction mode.

In some implementations, the mode costs may be obtained by generating pixel differences by subtracting the pixel values of the current macroblock after motion compensation from the pixel values of the original macroblock, and summing up the absolute values of the pixel differences.

Step S114: Select a mode with the smallest cost in the mode costs as an optimal prediction direction to encode the current macroblock.

In step S114, the mode with the smallest cost in the mode costs is selected, and a prediction motion vector of the mode is applied to perform motion compensation on the current macroblock to obtain pixel residuals for the macroblock. Further, the pixel residuals are written into a bit stream. In some implementations, if the selected mode with the smallest cost is a mode after performing motion compensation on the current macroblock using the two bidirectional prediction motion vectors obtained in the Direct prediction mode, a pixel residual after motion compensation using the two bidirectional prediction motion vectors is transformed, quantized and entropy encoded, and written into a bit stream.

During the mode selection, a motion vector of each inter-frame mode and a cost value of each mode do not need to be computed through motion estimation, and only the Skip prediction mode and the Direct prediction mode are kept. During the mode selection, only the mode costs after performing motion compensation on the current macroblock using different prediction motion vectors need to be computed, and therefore, the computation complexity and the amount of computation are reduced, and the video encoding efficiency can be improved.

In some implementations, the selected mode includes at least one of a time domain Direct prediction mode and a space domain Direct prediction mode. In some implementations, the time domain Direct prediction mode is employed. A segmenting manner of the Direct mode includes at least one of a 16×16 and a 8×8 segmentations. In some implementations, a Direct mode of 16×16 segmentation is employed. For application allowing higher complexity, costs computations for intra-frame prediction modes of different segmentations may be added to step S112, and the results are compared with costs of other inter-frame modes to select a mode with the smallest cost.

Because each video sequence is formed by consecutive GOPs, sequence encoding needs to be performed for each video sequence, and a video frame type needs to be set in the encoding process. In some implementations, the step of setting frame types for a plurality of a video sequence includes: obtaining a video sequence; encoding the first video frame in the video sequence as an I frame; encoding the second video frame in the video sequence as a P frame; using the third video frame in the video sequence as a current frame; setting the current frame as an $i^{th}$ frame, and executing the following steps on the current frame iteratively until the current frame is the last frame of the video sequence: determining whether motion information of a preceding P frame closest to the current frame is less than or equal to a preset threshold value; if yes, setting the $i^{th}$ video frame to the $(i+n-1)^{th}$ video frame as B frames, caching the B frames, encoding an $(i+n)^{th}$ video frame as a P frame, and using an $(i+n+1)^{th}$ video frame as a current frame; otherwise, encoding the $i^{th}$ video frame as a P frame, using an $(i+1)^{th}$ video frame as a current frame, and encoding the last video frame of the video sequence as a P frame, where i is an integer greater than or equal to 3 and n is an integer greater than or equal to 1.

In some implementations, the number of B frames (in the present invention, a B frame is a Direct B frame) consecutively appearing in the video sequence may be set in advance. For a video frame set as a Direct B frame, after a P frame following the video frame is encoded, the video frame is read from a cache and is encoded as a Direct B frame by executing step S104 to step S114.

Figure 2:
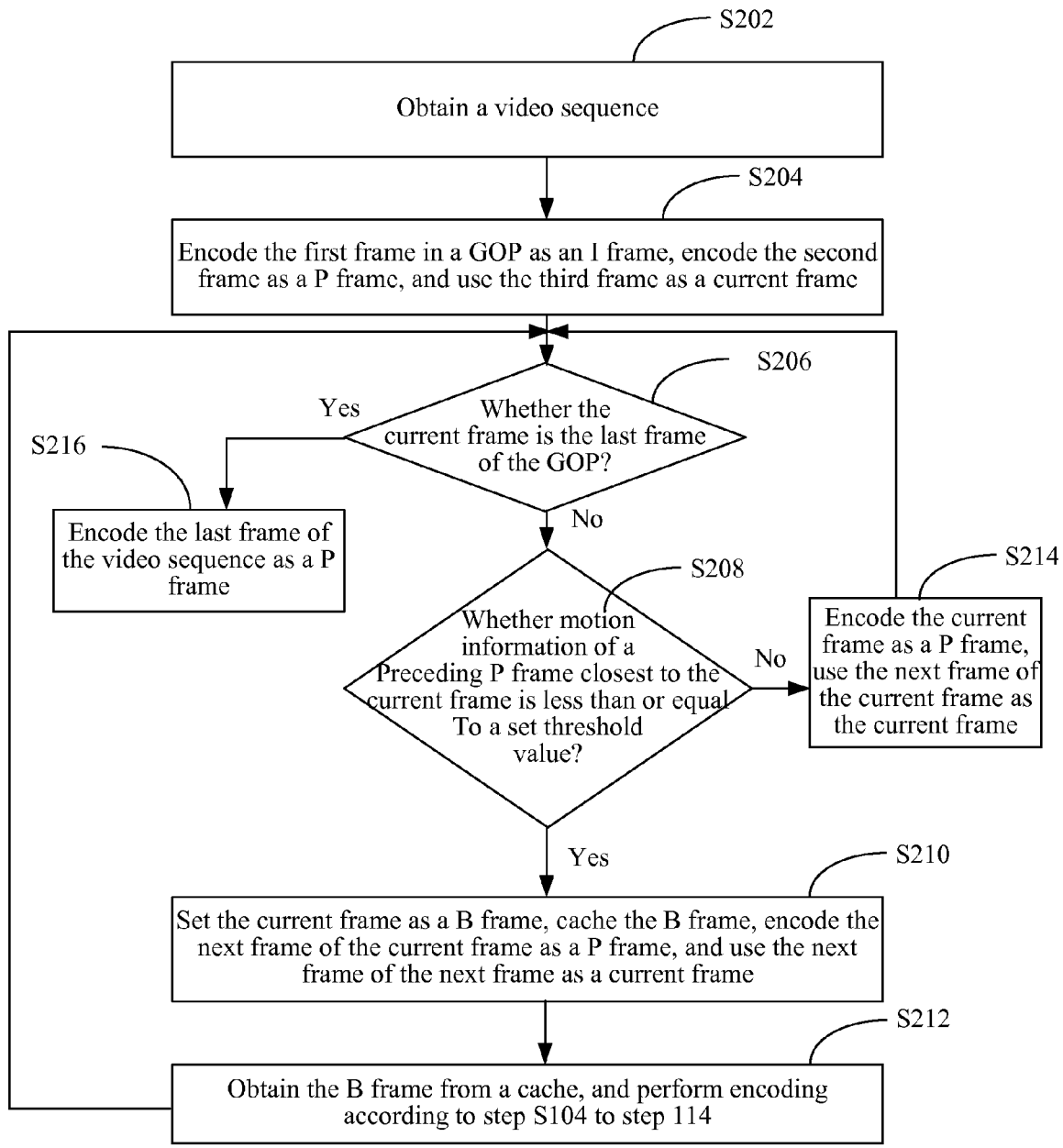
FIG. 2 is a schematic flow chart showing encoding of a video sequence (in the video sequence, the number of consecutively appearing Direct B frame is 1) in some implementations of the present invention.

The video encoding process of the present invention is illustrated taking n=1 as an example (the number of consecutively appearing Direct B frame is 1). As shown in FIG. 2, a process of encoding the video sequence is described as follows.

Step S202: Obtain a video sequence.

When the video sequence is obtained, a Group of Picture (GOP) in the video sequence is obtained.

Step S204: Encode the first frame in the GOP as an I frame, encode the second frame as a P frame, and use the third frame as a current frame.

Step S206: Determine whether the current frame is the last frame of the GOP, and if yes, proceed to step S216; otherwise, proceed to step S208.

Step S208: Determine whether motion information of a preceding P frame closest to the current frame is less than or equal to a preset threshold value, and if yes, proceed to step S210; otherwise, proceed to step S214.

Because the I frame only supports intra-frame prediction and a motion condition cannot be acquired, thus, for a B frame in the video sequence, reference needs to be made to a motion condition of a closest preceding P frame in a play order. As described above, during the mode selection, motion estimation is not performed for the Direct B frame. Therefore, in a scenario with violent motion, prediction on a motion vector is not accurate, and the amount of residual data is increased which reduces encoding quality of an image with the same bit rate. Therefore, in Step S208, it needs to be determined whether the current frame belongs to the current GOP and meets an encoding condition of a Direct B frame (i.e., whether the motion information of the preceding P frame closest to the current frame is less than or equal to the set threshold value), and whether to insert a Direct B frame is dynamically decided during the encoding.

If the motion information of the preceding P frame closest to the current frame is less than or equal to the preset threshold value, it indicates that motion of the encoded P frame is not violent, and the current frame is encoded as a B frame; otherwise, it indicates that motion of the encoded P frame is violent, and the current frame is encoded as a P frame.

Step S120: Set the current frame as a B frame, cache the B frame, encode a next frame of the current frame as a P frame, and use a next frame of the next frame as a current frame.

Step S212: Obtain the B frame from a cache, perform encoding according to step S104 to step S114, and return to step S206.

Step S214: Encode the current frame as a P frame, use a next frame of the current frame as a current frame, and return to step S206.

Step S216: Encode the last frame of the video sequence as a P frame.

Figure 3:
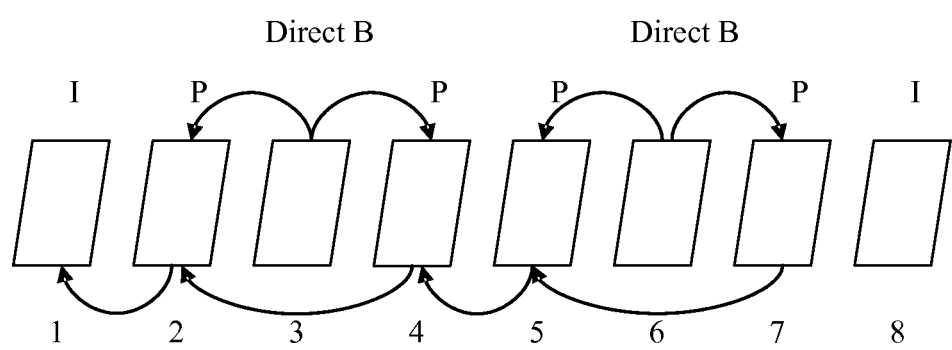
FIG. 3 is an exemplary diagram showing an encoded sequence with a GOP of a length 7 in some implementations of the present invention.

FIG. 3 is an example of an encoded sequence with a GOP of a length 7. In this example, the number of consecutively appearing B frame is 1, the first frame of the video sequence is encoded as an I frame, the second frame is encoded as a P frame, and the third frame meets an encoding condition of a B frame, and therefore, the third frame is encoded as a B frame. The fourth frame is encoded as a P frame, and the fifth frame does not meet the condition of a B frame, and therefore, the fifth frame is encoded as a P frame. The sixth frame meets the encoding condition of a B frame, so the sixth frame is encoded as a B frame, and the seventh frame is the last frame and is encoded as a P frame. In this example, the number of consecutively appearing B frame is 1 (i.e., n=1).

Whether the current frame is a B frame is determined based on a motion condition of the closest encoded P frame. Therefore, if it is determined that the motion of the encoded P frame is violent, the current frame is encoded as a P frame; otherwise, the current frame is encoded as a B frame. By self-adaptively setting the video frame as a B frame, the quality deterioration caused by B frame encoding in a scenario with violent motion can be effectively avoided.

In some implementations, the motion information includes an average motion vector residual of macroblocks in a preceding P frame closest to the current frame, i.e., a result of a sum of motion vector residuals of all the macroblocks in the P frame divided by a total number of the macroblocks. In some implementations, the threshold value may be set as $$2 \times \left(\frac{bitrate}{50}\right)^{\frac{1}{3}}$$

under bit rate control, where the bitrate is a bit rate (using kbps as the unit) set under the bit rate control. Without the bit rate control, the threshold value may be set as $$\frac{250}{QP},$$

where the QP is a quantized value set for encoding a video frame.

Figure 4:
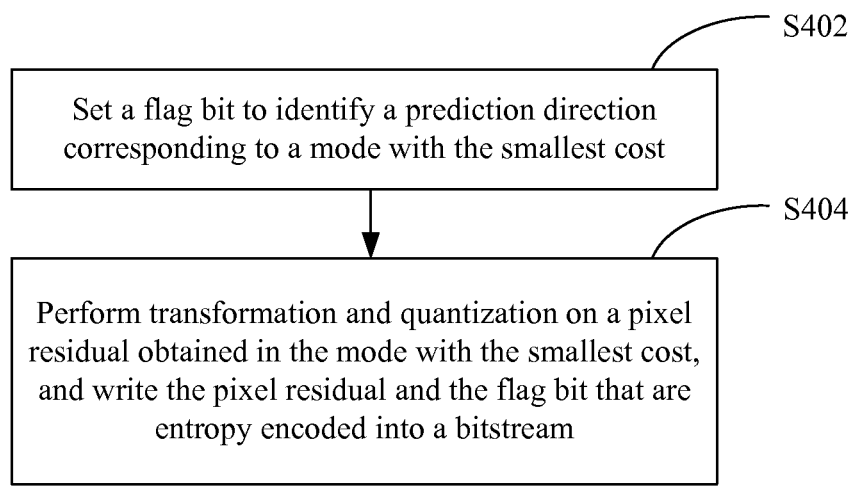
FIG. 4 is a schematic flow chart showing encoding of a current macroblock according to an optimal prediction direction in some implementations of the present invention.

In some implementations, as shown in FIG. 4, the step of selecting the mode with the smallest cost in the mode costs as the optimal prediction direction to encode the current macroblock includes the following steps.

Step S402: Set a flag bit used to identify a prediction direction corresponding to the mode with the smallest cost.

In some implementations, for the Skip prediction mode, only the number of consecutive Skip macroblocks needs to be recorded. For the Direct prediction mode, a flag bit originally used to identify the Direct prediction mode in a bit stream may be changed, and a flag bit used to identify the prediction direction corresponding to the mode with the smallest cost is set. For example, DIRECT_L0(2), DIRECT_L0(1), and DIRECT_L0(0) may be used to respectively identify a forward Direct prediction mode, a backward Direct prediction mode, and a bidirectional Direct prediction mode adopted in the current macroblock. In a process of encoding the B frame, only the Skip prediction mode and the Direct prediction mode are included, and an intra-frame prediction mode and an inter-frame prediction mode do not exist; therefore, the bit rate can be improved.

Step S404: Perform transformation and quantization on a pixel residual obtained in the mode with the smallest cost, and write the pixel residual and the flag bit that are entropy encoded into the bit stream.

In some implementations, after the mode with the smallest cost is selected, the pixel residual after performing motion compensation on the current macroblock using the prediction motion vector under the selected mode may be obtained.

Figure 5:
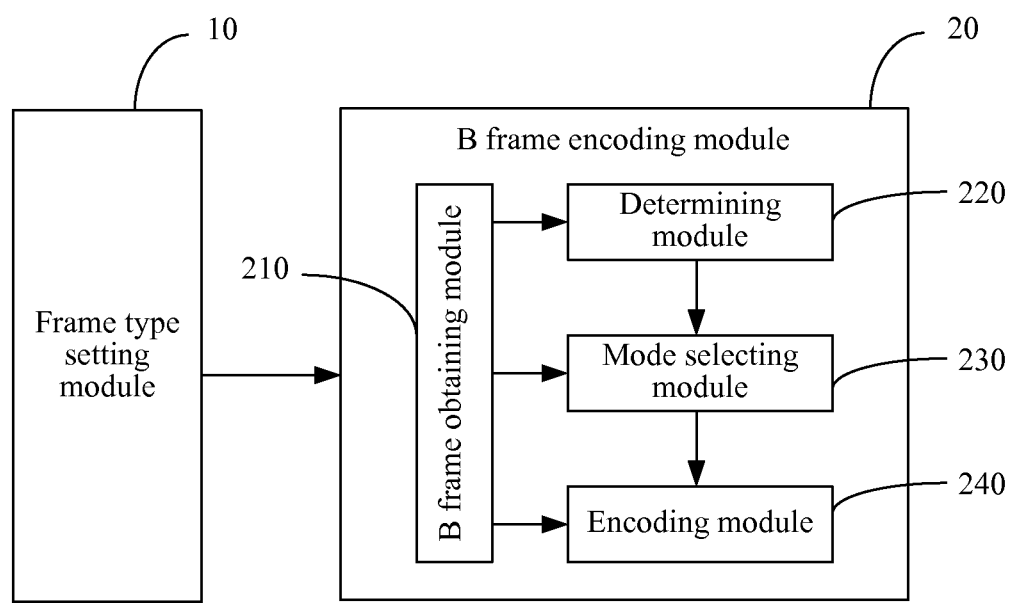
FIG. 5 is a schematic structural diagram of a video encoding apparatus in some implementations of the present invention.

FIG. 5 shows a video encoding apparatus according to some implementations of the present invention, which includes a frame type setting module 10 and a B frame encoding module 20. The frame type setting module 10 is configured to set a frame type for a video sequence. The B frame encoding module 20 includes a B frame obtaining module 210, a determining module 220, a mode selecting module 230, and an encoding module 240.

In some implementations, the B frame obtaining module 210 is configured to obtain a video frame set as a B frame; and the determining module 220 is configured to determine whether a current macroblock of the video frame satisfies a Direct prediction mode, and when the current macroblock satisfies the Direct prediction mode, further determine whether the current macroblock satisfies a Skip prediction mode.

In some implementations, two bidirectional prediction motion vectors of the current macroblock of the video frame may be obtained through the Direct prediction mode. Further, if each of the obtained two bidirectional prediction motion vectors is within a preset threshold value range, the determining module 220 determines that the current macroblock satisfies the Direct prediction mode; otherwise, the determining module 220 determines that the current macroblock does not satisfy the Direct prediction mode.

Further, motion compensation is performed on the current macroblock using the obtained bidirectional prediction motion vectors, thereby generating a predicted pixel value. The predicted pixel value is subtracted from an original pixel value to obtain a pixel residual. The determining module 220 is configured to determine whether residual system energy of the pixel residual after the pixel residual is transformed and quantized (in general, the number of residual coefficient greater than 1 in one macroblock is used, or the residual coefficients are weighted according to their respective positions) is greater than a preset threshold value, and if yes, a condition of a Skip prediction mode is not satisfied; otherwise, the Skip prediction mode is satisfied.

The mode selecting module 230 is configured to compute at least one of the plurality of mode costs: a mode cost after performing motion compensation on the current macroblock using the bidirectional prediction motion vectors obtained in the Direct prediction mode; a mode cost after performing motion compensation on the current macroblock using a forward prediction motion vector obtained in the Direct prediction mode; and a mode cost after performing motion compensation on the current macroblock using a backward prediction motion vector obtained in the Direct prediction mode, and select a mode with the smallest cost in the mode costs as an optimal prediction direction.

The encoding module 240 is configured to encode the current macroblock according to the optimal prediction direction selected by the mode selecting module 230.

In some implementations, the selected mode includes at least one of a time domain Direct prediction mode and a space domain Direct prediction mode. In some implementations, the time domain Direct prediction mode is employed. A segmenting manner of the Direct mode includes at least one of a 16×16 and a 8×8 segmentations. In some implementations, a Direct mode of 16×16 segmentation is employed. For application allowing higher complexity, the mode selecting module 230 further computes costs for intra-frame prediction modes of different segmentations, compares the costs for intra-frame prediction modes with costs for other inter-frame modes, and selects a mode with the smallest cost.

Figure 6:
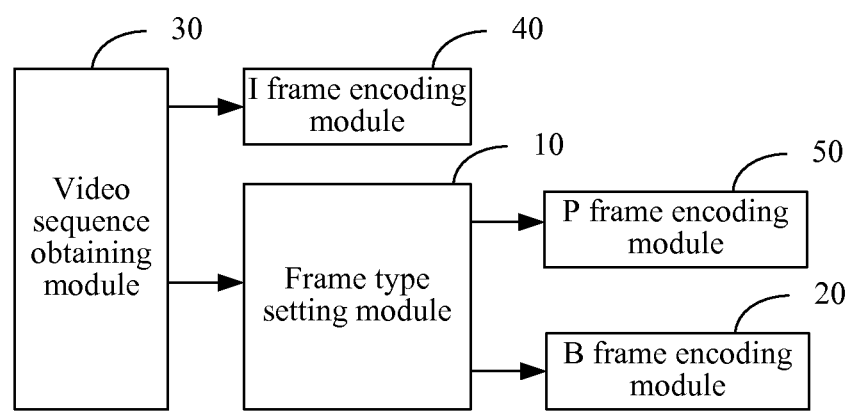
FIG. 6 is a schematic structural diagram of a video encoding apparatus in yet another implementation of the present invention.

Because each video sequence is formed by consecutive GOPs, sequence encoding needs to be performed for each video sequence, and a video frame type needs to be set in the encoding process. In some implementations shown in FIG. 6, the video encoding apparatus further includes a video sequence obtaining module 30, an I frame encoding module 40, and a P frame encoding module 50, where the video sequence obtaining module 30 is configured to obtain a video sequence; the I frame encoding module 40 is configured to encode the first frame in the video sequence as an I frame; and the P frame encoding module 50 is configured to encode the second frame in the video sequence as a P frame.

In some implementations, the frame type setting module 10 is configured to use the third frame in the video sequence as a current frame, set the current frame as an $i^{th}$ frame, and perform the following steps on the current frame iteratively until a current frame is the last frame of the video sequence: determining whether motion information of a preceding P frame closest to the current frame is less than or equal to a preset threshold value; if yes, setting an $i^{th}$ frame to an $(i+n-1)^{th}$ frame as a B frame, caching the B frame, notifying the P frame encoding module 50 to encode an $(i+n)^{th}$ frame as a P frame, and using an $(i+n+1)^{th}$ frame as a current frame; otherwise, notifying the P frame encoding module 50 to encode the $i^{th}$ frame as a P frame, and using an $(i+1)^{th}$ frame as a current frame, where i is an integer greater than or equal to 3 and n is an integer greater than or equal to 1.

In some implementations, the P frame encoding module 40 is further configured to, when the motion information of a preceding P frame closest to the current frame is greater than the set threshold value, encode the current frame as a P frame, and notify the frame type setting module 10 to use a next frame of the current frame as a current frame. The P frame encoding module 40 is further configured to encode the last frame of the video sequence as a P frame.

Because the I frame only supports intra-frame prediction and a motion condition cannot be acquired, for a B frame in the video sequence, reference needs to be made to a motion condition of a preceding P frame in a play order. As described above, during the mode selection, motion estimation is not performed for the Direct B frame. Therefore, in a scenario with violent motion, prediction on a motion vector is not accurate, and the amount of residual data is increased, which reduces an encoding quality of an image with the same bit rate. Therefore, the frame type setting module 10 needs to determine whether the current frame belongs to the current GOP and meets an encoding condition of a Direct B frame, and decide whether to inset a Direct B frame dynamically during the encoding.

In some implementations, the frame type setting module 10 obtains the motion information of a preceding P frame closest to the current frame, and compares the motion information with the set threshold value. If the motion information of the P frame is less than or equal to the set threshold value, it indicates that motion of the encoded P frame is not violent, the frame type setting module 10 sets the current frame as a B frame. When the motion information of the P frame is greater than the set threshold value, it indicates that the motion of the encoded P frame is violent, and the P frame encoding module 50 codes the current frame as a P frame.

In some implementations, the motion information includes an average motion vector residual of macroblocks in the preceding P frame closest to the current frame, i.e., a result of dividing a sum of motion vector residuals of all the macroblocks by a total number of the macroblocks. In some implementations, the threshold value may be set as $$2 \times \left(\frac{bitrate}{50}\right)^{\frac{1}{3}}$$

under bit rate control, where the bitrate is a bit rate (using kbps as a unit) set under the bit rate control. Without the bit rate control, the threshold value may be set as $$\frac{250}{QP},$$

where the QP is a quantized value set for encoding a frame.

After the frame type setting module 10 sets the current frame as a B frame, the B frame is cached, so that the B frame encoding module 20 obtains the B frame from the cache and completes the encoding of the B frame.

Figure 7:
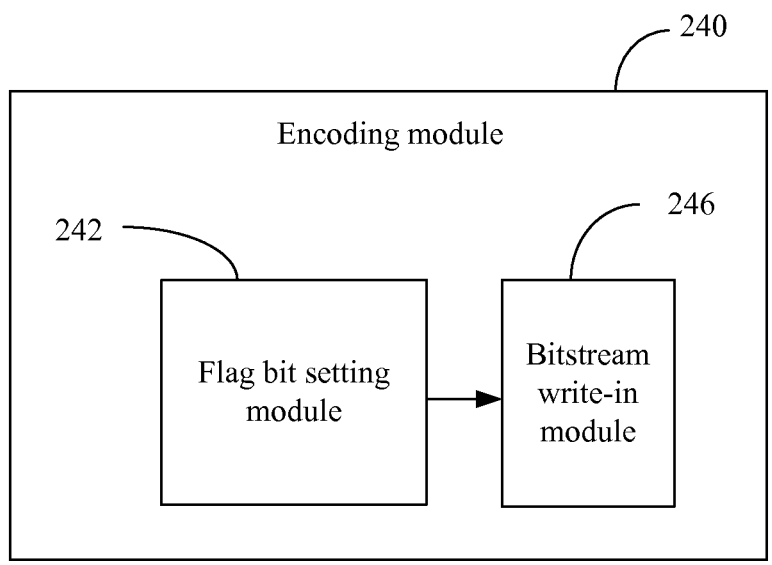
FIG. 7 is a schematic structural diagram of an encoding module in some implementations of the present invention.
Figure 8:
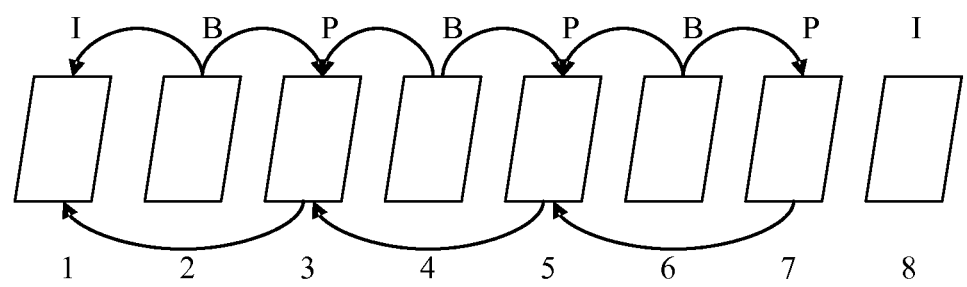
FIG. 8 is an exemplary diagram showing an encoded sequence with a GOP of a length 7 in the conventional art.

In some implementations shown in FIG. 7, the encoding module 240 includes a flag bit setting module 242 and a bit stream write-in module 244.

In some implementations, the flag bit setting module 242 is configured to set a flag bit to identify a prediction direction corresponding to the mode with the smallest cost.

In some implementations, for the Skip prediction mode, only the number of consecutive Skip macroblocks needs to be recorded. For the Direct prediction mode, a flag bit originally used to identify the Direct prediction mode in the bit stream may be changed, and a flag bit used to identify the prediction direction corresponding to the mode with the smallest cost is set. For example, the flag bit setting module 242 may use DIRECT_L0(2), DIRECT_L0(1), and DIRECT_L0(0) to respectively identify a forward Direct prediction mode, a backward Direct prediction mode, and a bidirectional Direct prediction mode adopted in the current macroblock. In a process of encoding the B frame, only the Skip prediction mode and the Direct prediction mode are included, and an intra-frame prediction mode and an inter-frame prediction mode do not exist. Therefore, the bit rate can be improved.

The bit stream write-in module 244 is configured to perform transformation and quantization on a pixel residual obtained in the mode with the smallest cost, and write the pixel residual and the flag bit that are entropy encoded into the bit stream.

Figure 9:
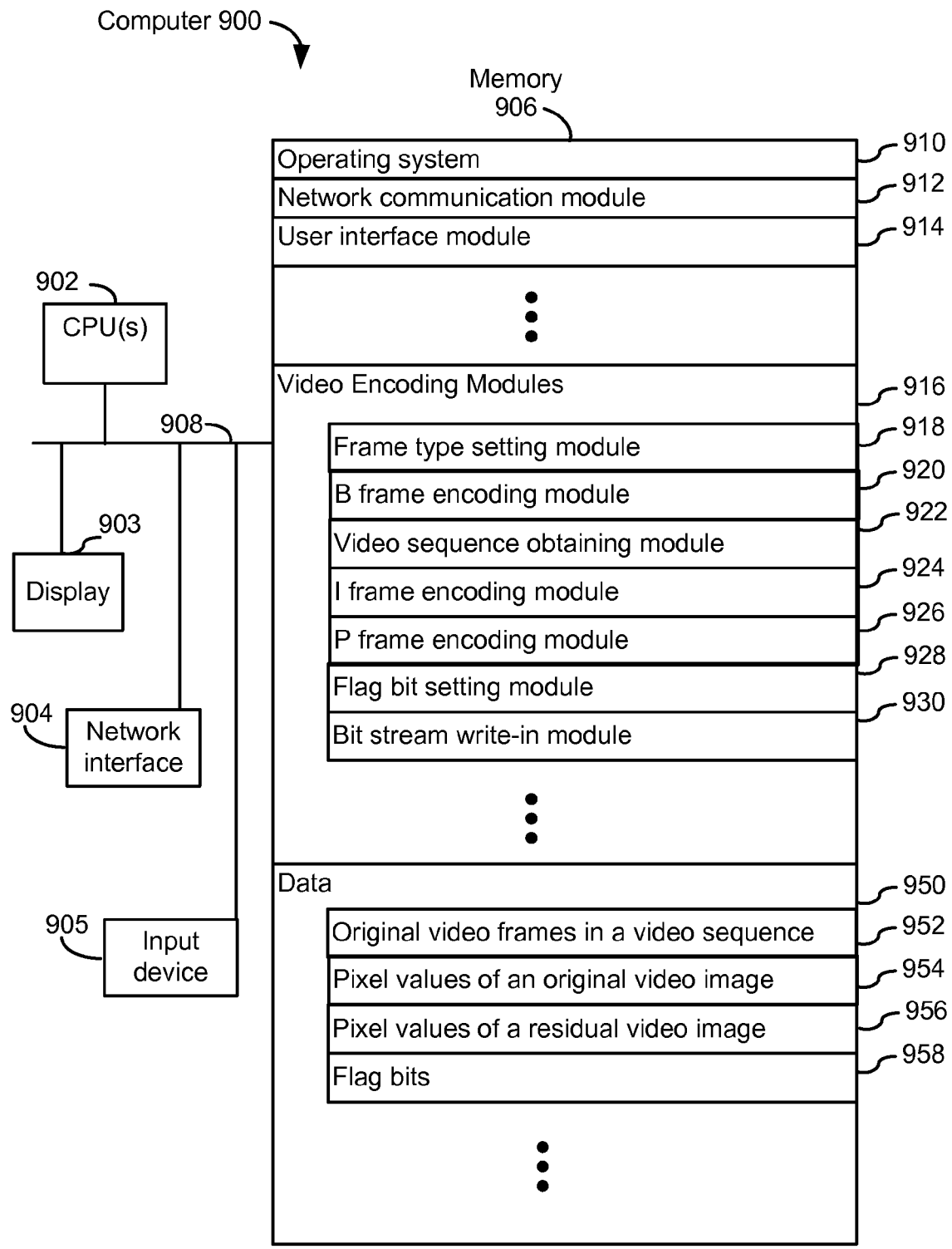
FIG. 9 is a block diagram illustrating an exemplary computer implementing the video encoding method in accordance with some implementations of the present application.

FIG. 9 is a block diagram illustrating an exemplary computer 900 implementing the video encoding method in accordance with some implementations of the present application. The computer 900 may be a desktop, a laptop, a smartphone, a tablet, etc. The computer 900 includes one or more processing units CPU(s) 902 (also herein referred to as processors), one or more network interfaces 904, one or more input devices 905, a display 903, memory 906, and one or more communication buses 908 for interconnecting these components. In some implementations, the one or more user input devices 905 include a keyboard, a mouse, a trackpad, and a touchscreen. The communication buses 908 optionally include circuitry (sometimes called a chipset) that interconnects and controls communications between system components.

The memory 906 typically includes high-speed random access memory, such as DRAM, SRAM, or other random access solid state memory devices; and optionally includes non-volatile memory, such as one or more magnetic disk storage devices, optical disk storage devices, flash memory devices, or other non-volatile solid state storage devices. The memory 906 optionally includes one or more storage devices remotely located from the CPU(s) 902. The memory 906 or alternatively the non-volatile memory device(s) within the memory 906, comprises a non-transitory computer readable storage medium. In some implementations, the memory 906 or alternatively the non-transitory computer readable storage medium stores the following programs, modules and data structures, or a subset thereof:

- an operating system 910, which includes procedures for handling various basic system services and for performing hardware dependent tasks;
- a network communication module (or instructions) 912 for connecting the computer 900 with other devices (e.g., a remote server or client device) via one or more network interfaces 904 (wired or wireless) and a communication network (e.g., the Internet);
- a user interface module 914 for displaying different user interface controls (e.g., textboxes or dropdown lists or push buttons) as well as data and images in accordance with user input;
- a video encoding module 916 that further includes: a frame type setting module 918, a B frame encoding module 920, a video sequence obtaining module 922, an I frame encoding module 924, a P frame encoding module 926, a flag bit setting module 928, and a bit stream write-in module 930, etc., which are described above in connection with FIGS. 1, 2, and 4; and
- Data 950 stored in the memory 906 that further includes original video frames in a video sequence 952; pixel values of an original video image 954; pixel values of a residual video image 956; flag bits 958 etc., each occupying a predefined region in the memory 906.

Persons of ordinary skill in the art should understand that all or a part of the steps of the method according to the implementations may be implemented by a computer program instructing relevant hardware. The program may be stored in a non-transitory computer readable storage medium. When the program is run, the steps of the method according to the implementations are performed. The storage medium may be a magnetic disk, an optical disk, a read-only memory (Read-Only Memory, ROM), or a random access memory (Random Access Memory, RAM).

The implementations described above only represent several implementation manners of the present invention, and descriptions thereof are specific and detailed, but should not be understood as a limit to the scope of the present invention. It should be pointed out that persons of ordinary skill in the art can make modifications and improvements without departing from the idea of the present invention and these modifications and improvements all belong to the protection scope of the present invention. Therefore, the protection scope of the present invention should be subject to the protection scope of the appended claims.

While particular implementations are described above, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A video encoding method, the method comprising:
at a video encoding apparatus having memory and one or more processors:
   setting frame types for a plurality of video frames in a video sequence;
   obtaining a video frame set as a B frame from the plurality of video frames;
   determining whether a current macroblock of the video frame satisfies a Direct prediction mode, and when the current macroblock satisfies the Direct prediction mode, further determining whether the current macroblock satisfies a Skip prediction mode;
   if the current macroblock does not satisfy the Direct prediction mode or the current macroblock does not satisfy the Skip prediction mode, computing at least one of a plurality of mode costs, including:
      a mode cost after performing motion compensation on the current macroblock using two bidirectional prediction motion vectors obtained in the Direct prediction mode;
      a mode cost after performing motion compensation on the current macroblock using a forward prediction motion vector obtained in the Direct prediction mode; and
      a mode cost after performing motion compensation on the current macroblock using a backward prediction motion vector obtained in the Direct prediction mode; and
   selecting a mode with a smallest cost in the plurality of mode costs as an optimal prediction direction to encode the current macroblock.

2. The video encoding method according to claim 1, wherein setting frame types for a plurality of video frames in a video further sequence comprises:
  obtaining a video sequence;
  encoding a first video frame of the video sequence as an I frame;
  encoding a second video frame of the video sequence as a P frame;
  setting a third video frame of the video sequence as a current frame; and
  setting the current frame as an $i^{th}$ frame, and performing the following steps iteratively on the current frame until the current frame is the last video frame of the video sequence:
    determining whether motion information of a preceding P frame closest to the current frame is less than or equal to a preset threshold value,
    if yes, setting the $i^{th}$ video frame to an $(i+n-1)^{th}$ video frame as B frames, caching the B frames, encoding an $(i+n)^{th}$ video frame as a P frame, and setting an $(i+n+1)^{th}$ video frame as the current frame; and
    if not, encoding the $i^{th}$ video frame as a P frame, and setting an $(i+1)^{th}$ video frame as the current frame; and
  encoding the last video frame in the video sequence as a P frame,
  wherein i is an integer greater than or equal to 3, and n is an integer greater than or equal to 1.

3. The video encoding method according to claim 2, wherein the motion information comprises an average motion vector residual of macroblocks in a preceding P frame closest to the current frame; and
  the set threshold value is $$2 \times \left(\frac{bitrate}{50}\right)^{\frac{1}{3}} \text{ or } \frac{250}{QP},$$

wherein the bitrate is a bit rate set under a bitrate control, and the QP is a quantized value set for encoding a video frame.

4. The video encoding method according to claim 1, wherein the selected mode comprises at least one of a time domain Direct prediction mode and a space domain Direct prediction mode, and a segmenting manner of the time domain Direct prediction mode or the space domain Direct prediction mode comprises at least one of a 16×16 segmentation and an 8×8 segmentation.

5. The video encoding method according to claim 1, wherein selecting a mode with a smallest cost in the plurality of mode costs as an optimal prediction direction to encode the current macroblock further comprises:
  setting a flag bit to identify a prediction direction corresponding to the mode with the smallest cost; and
  performing transformation and quantization on a pixel residual obtained in the mode with the smallest cost; and
  writing the pixel residual and the flag bit that are entropy encoded into a bit stream.

6. A video encoding apparatus having memory and one or more processors, the apparatus comprising:
  a frame type setting module configured to set frame types for a plurality of video frames in a video sequence; and
  a B frame encoding module,
  wherein the B frame encoding module further comprises:
    a B frame obtaining module configured to obtain a video frame set as a B frame from the plurality of video frames;
    a determining module configured to determine whether a current macroblock of the video frame satisfies a Direct prediction mode, and when the current macroblock satisfies the Direct prediction mode, further determine whether the current macroblock satisfies a Skip prediction mode;
    a mode selecting module configured to compute at least one of a plurality of mode costs if the current macroblock does not satisfy the Direct prediction mode or the current macroblock does not satisfy the Skip prediction mode, the plurality of mode costs including:
      a mode cost after performing motion compensation on the current macroblock using two bidirectional prediction motion vectors obtained in the Direct prediction mode;
      a mode cost after performing motion compensation on the current macroblock using a forward prediction motion vector obtained in the Direct prediction mode; and
      a mode cost after performing motion compensation on the current macroblock using a backward prediction motion vector obtained in the Direct prediction mode; and
    the mode selecting module is further configured to select a mode with the smallest cost in the plurality of mode costs as an optimal prediction direction; and
    an encoding module configured to encode the current macroblock according to the selected optimal prediction direction.

7. The video encoding apparatus according to claim 6, further comprises:
  a video sequence obtaining module configured to obtain a video sequence;
  an I frame encoding module configured to encode a first video frame in the video sequence as an I frame; and
  a P frame encoding module configured to encode a second video frame in the video sequence as a P frame,
  wherein
  the frame type setting module is configured to set a third video frame in the video sequence as a current frame, set the current frame as an $i^{th}$ frame, and perform the following steps iteratively on the current frame until the current frame is the last video frame of the video sequence:
    determining whether motion information of a preceding P frame closest to the current frame is less than or equal to a preset threshold value,
    if yes, setting the $i^{th}$ video frame to an $(i+n-1)^{th}$ video frame as B frames, caching the B frames, notifying the P frame encoding module to encode an $(i+n)^{th}$ video frame as a P frame, and setting an $(i+n+1)^{th}$ video frame as the current frame; and
    if not, notifying the P frame encoding module to encode the $i^{th}$ frame as a P frame, and setting an $(i+1)^{th}$ frame as the current frame; and
  the P frame encoding module is further configured to encode the last video frame of the video sequence as a P frame,
  wherein i is an integer greater than or equal to 3, and n is an integer greater than or equal to 1.

8. The video encoding apparatus according to claim 7, wherein the motion information comprises an average motion vector residual of macroblocks in a preceding P frame closest to the current frame; and
the set threshold value is $$2 \times \left(\frac{bitrate}{50}\right)^{\frac{1}{3}} \text{ or } \frac{250}{QP},$$

wherein the bitrate is a bit rate set under a bitrate control, and the QP is a quantized value set for encoding a video frame.

9. The video encoding apparatus according to claim 6, wherein the selected mode comprises at least one of a time domain Direct prediction mode and a space domain Direct prediction mode, and a segmenting manner of the time domain Direct prediction mode or the space domain Direct prediction mode comprises at least one of a 16×16 segmentation and a 8×8 segmentation.

10. The video encoding apparatus according to claim 6, wherein the encoding module further comprises:
a flag bit setting module configured to set a flag bit to identify a prediction direction corresponding to the mode with the smallest cost; and
a bit stream write-in module configured to perform transformation and quantization on a pixel residual obtained in the mode with the smallest cost, and write the pixel residual and the flag bit that are entropy encoded into a bit stream.

11. A non-transitory computer readable medium used in conjunction with a video encoding apparatus, the computer readable medium comprising instructions for:
setting frame types for a plurality of video frames in a video sequence;
obtaining a video frame set as a B frame from the plurality of video frames;
determining whether a current macroblock of the video frame satisfies a Direct prediction mode, and when the current macroblock satisfies the Direct prediction mode, further determining whether the current macroblock satisfies a Skip prediction mode;
if the current macroblock does not satisfy the Direct prediction mode or the current macroblock does not satisfy the Skip prediction mode, computing at least one of the plurality of mode costs, including:
a mode cost after performing motion compensation on the current macroblock using two bidirectional prediction motion vectors obtained in the Direct prediction mode;
a mode cost after performing motion compensation on the current macroblock using a forward prediction motion vector obtained in the Direct prediction mode; and
a mode cost after performing motion compensation on the current macroblock using a backward prediction motion vector obtained in the Direct prediction mode; and
selecting a mode with a smallest cost in the plurality of mode costs as an optimal prediction direction to encode the current macroblock.

12. The non-transitory computer readable medium according to claim 11, wherein setting frame types for a plurality of video frames in a video sequence further includes instructions for:
obtaining a video sequence;
encoding a first video frame of the video sequence as an I frame;
encoding a second video frame of the video sequence as a P frame;
setting a third video frame of the video sequence as a current frame; and
setting the current frame as an $i^{th}$ frame, and performing the following steps iteratively on the current frame until the current frame is the last video frame of the video sequence:
determining whether motion information of a preceding P frame closest to the current frame is less than or equal to a preset threshold value,
if yes, setting the $i^{th}$ video frame to an $(i+n-1)^{th}$ video frame as B frames, caching the B frames, encoding an $(i+n)^{th}$ video frame as a P frame, and setting an $(i+n+1)^{th}$ video frame as the current frame; and
if not, encoding the $i^{th}$ video frame as a P frame, and setting an $(i+1)^{th}$ video frame as the current frame; and
encoding the last video frame in the video sequence as a P frame,
wherein i is an integer greater than or equal to 3, and n is an integer greater than or equal to 1.

13. The non-transitory computer readable medium according to claim 12, wherein the motion information comprises an average motion vector residual of macroblocks in a preceding P frame closest to the current frame; and
the set threshold value is $$2 \times \left(\frac{bitrate}{50}\right)^{\frac{1}{3}} \text{ or } \frac{250}{QP},$$

wherein the bitrate is a bit rate set under a bitrate control, and the QP is a quantized value set for encoding a video frame.

14. The non-transitory computer readable medium according to claim 11, wherein the selected mode comprises at least one of a time domain Direct prediction mode and a space domain Direct prediction mode, and a segmenting manner of the time domain Direct prediction mode or the space domain Direct prediction mode comprises at least one of a 16×16 segmentation and an 8×8 segmentation.

15. The non-transitory computer readable medium according to claim 11, wherein selecting a mode with a smallest cost in the plurality of mode costs as an optimal prediction direction to encode the current macroblock further comprises:
setting a flag bit to identify a prediction direction corresponding to the mode with the smallest cost; and
performing transformation and quantization on a pixel residual obtained in the mode with the smallest cost, and writing the pixel residual and the flag bit that are entropy encoded into a bit stream.

* * * * *